United States Patent [19]

Saito

[11] Patent Number: 5,034,312
[45] Date of Patent: Jul. 23, 1991

[54] METHOD OF CONTROLLING PHOTOGRAPHIC EMULSION MANUFACTURING PROCESS BY NON-LINEAR APPROXIMATION

[75] Inventor: Masanori Saito, Hachioji, Japan

[73] Assignee: Konica Corporation, Tokyo, Japan

[21] Appl. No.: 478,034

[22] Filed: Feb. 9, 1990

Related U.S. Application Data

[63] Continuation of Ser. No. 248,295, Sep. 21, 1988, abandoned, which is a continuation of Ser. No. 54,045, May 26, 1987, abandoned, which is a continuation of Ser. No. 892,724, Jul. 29, 1986, abandoned, which is a continuation of Ser. No. 771,905, Sep. 3, 1985, abandoned.

[30] Foreign Application Priority Data

Sep. 5, 1984 [JP] Japan ................................ 59-186683

[51] Int. Cl.$^5$ ................................ G03C 1/02
[52] U.S. Cl. ................................ 430/569; 364/149; 364/150; 364/151
[58] Field of Search ................. 430/569; 364/149-151

[56] References Cited

U.S. PATENT DOCUMENTS 4,184,877  1/1980  Maternagnan ................. 430/569
4,378,427  3/1983  Byer ................................ 430/569

FOREIGN PATENT DOCUMENTS 0675768  12/1963  Canada ........................... 430/569
1335925  10/1973  United Kingdom ............. 430/567

OTHER PUBLICATIONS

Cremer, "Chem. Eng. Practice", 1966, vol. 9, pp. 316, 317, 340, 341.
Bamberger et al., "Adaptive On-Line Optimization . . .", pp. 543-550, 1977.
Landau, "Algorithms For Discrete Time Model . . .", pp. 1-11, 1975.

*Primary Examiner*—Richard L. Schilling
*Attorney, Agent, or Firm*—Nilles & Nilles

[57] ABSTRACT

A method of controlling a photographic emulsion manufacturing process by non-linear approximation, wherein the set of (k) of a plurality of process inputs, the set (k) of a plurality of states, such as the silver halide concentration, the set (k) of a plurality of process outputs, such as the potential of silver and the pH value, and an evaluation function J (k) are defined, so that a feedback matrix $_b$ (k) and a feed-forward control matrix $f$(k) which minimize said evaluation function J (k) are obtained and that manipulated variables which are to be applied to a plant is calculated from the obtained feedback matrix $\phi_b$ (k) and feed-forward matrix $f$(k).

2 Claims, 1 Drawing Sheet

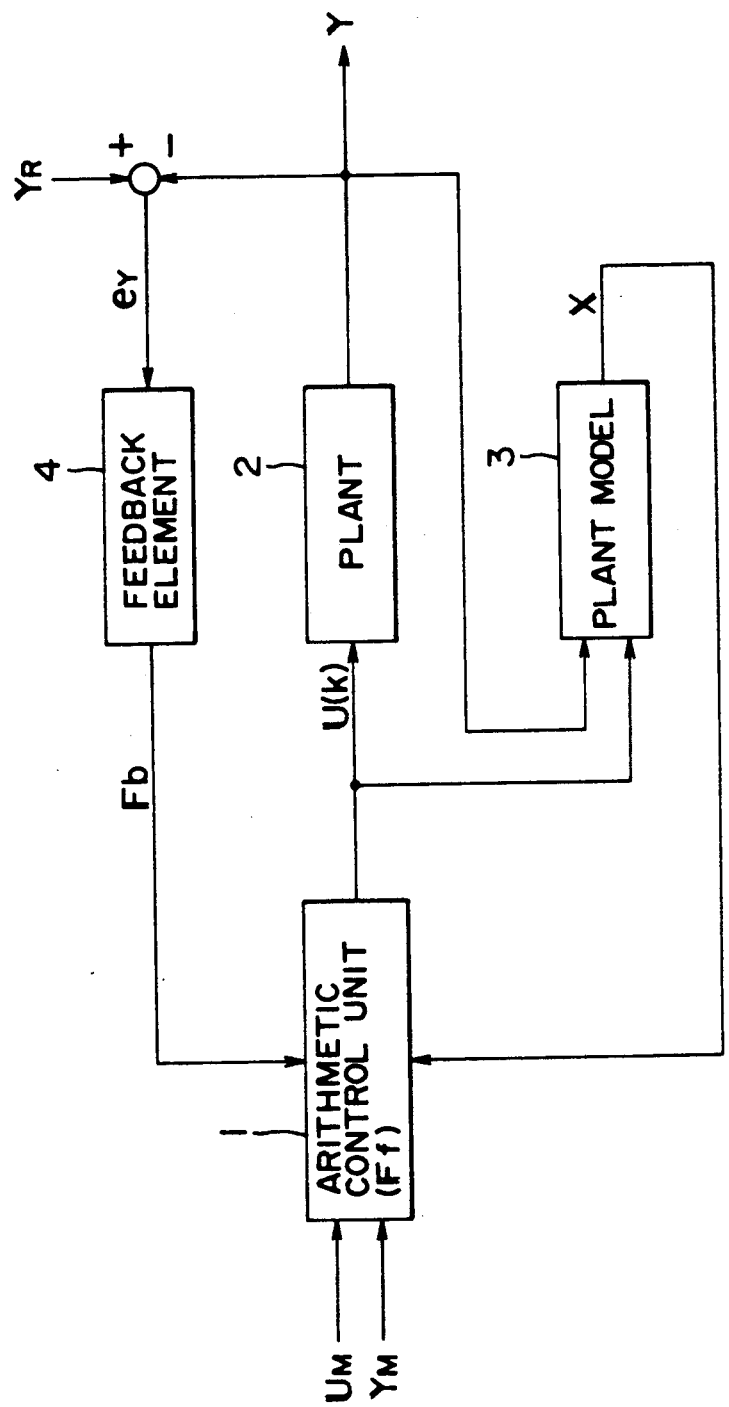

METHOD OF CONTROLLING PHOTOGRAPHIC EMULSION MANUFACTURING PROCESS BY NON-LINEAR APPROXIMATION

This application is a continuation of application Ser. No. 248,295, filed Sept. 21, 1988 which is a continuation of Ser. No. 54,045, mailed May 26, 1987, which is a continuation of Ser. No. 892,724, filed July 29, 1986, which is a continuation of Ser. No. 771,905, filed Sept. 3, 1985, all abandoned.

BACKGROUND OF THE INVENTION

1. Field of the Invention

The present invention relates to a method of controlling a photographic emulsion manufacturing process. More particularly, the invention pertains to a control method by non-linear approximation for a photographic emulsion manufacturing process which involves a multiplicity of variables.

2. Description of the Prior Art

Photographic emulsion which are employed for photosensitive materials, such as photographic paper and film, generally include silver halide as a principal component. Silver halide is a compound of a halogen, such as Br, and silver, and is widely used as a material for photographic emulsions. Such silver halide is produced by crystallization in which silver nitrate ($AgNO_3$) and potassium bromide (KBr) or potassium iodide (KI) or sodium chloride (NaCl) are added together such that they react to crystallize silver halide.

In this type of reaction crystallization step, it is not possible to directly measure the degree of crystal growth of silver halide itself. For this reason, it is conventional practice to estimate the degree of growth of silver halide from the silver concentration in the solution which is related to the growth of silver halide.

In the process of crystal growth of silver halide, a considerable number of operations in the control of crystal growth are conducted based on the operator's experience, since some of the mechanism of the crystal growth has not yet been satisfactorily elucidated. Further, in the crystal growth process of the above-described type, the growth of crystals of silver halide is affected by various factors, such as the solution temperature and the rate of stirring, in addition to the silver concentration and the halogen concentration in the solution. A change in even one of these process variates has an effect on the other variates. In such a control (multivariable control) in which a change in one of the process variates affects the other variates, it is not possible according to the conventional PID control to effect control in such a manner that process variates as objects of measurement are measured, and the respective manipulated variables of the measured variates are simultaneously and automatically controlled so that each controlled variable coincides with a desired value.

SUMMARY OF THE INVENTION

In view of the above-described circumstances, it is a primary object of the present invention to realize a control method which enables a feedback or feed-forward control to be easily effected even in a multivariable control process by non-linearly approximating the state of the system.

To this end, the present invention provides a method of controlling a photographic emulsion manufacturing process by non-linear approximation, the method comprising: defining the set $(k)$ of a plurality of process inputs, such as the flow rate of silver nitrate, as follows:

$$(k) = [U_1(k), \ldots U_n(k)]^T = [\ _M{}^T(k),\ _C{}^T(k)]^T$$

defining the set $(k)$ of a plurality of states, such as the silver halide concentration, as follows:

$$(k) = [X_1(k), \ldots, X_m(k)]^T$$

defining the set $(k)$ of a plurality of process outputs, such as the potential of silver and the pH value, as follows:

$$(k) = [Y_1(k), \ldots, Y_s(k)]^T$$

non-linearly approximating the system by an equation of state which is given by the following formula:

$$(k) = (k,\ '(k),\ '(k))$$

defining an evaluation function $J(k)$ expressed by the following formula:

$$J(k) = \ _Y{}^T(k) \cdot (k)\ _Y(k) + \Delta\ _C{}^T(k) \cdot \Delta\ _C(k)$$

where $$_Y(k) = (k) - \ _R(k)$$

$$\Delta\ _C(k) = [\ _C(k) - \alpha \cdot\ _C(k-1)]$$

$$(k) = \text{diag}\ [Q_1(k), \ldots, Q_s(k)]$$

$$(k) = \text{diag}\ [R_1(k), \ldots, R_n(k)]$$

obtaining a feedback matrix $_b(k)$ and a feed-forward control matrix $_f(k)$ which minimize the evaluation function $J(k)$; and calculating manipulated variables which are to be applied to the plant from the obtained feedback matrix $_b(k)$ and feed-forward control matrix $_f(k)$.

The above and other objects, features and advantages of the present invention will become apparent from the following description taken in conjunction with the accompanying drawings.

BRIEF DESCRIPTION OF THE DRAWING

The attached sole FIGURE is a block diagram of one example of a photographic emulsion manufacturing process for carrying out the present invention.

DESCRIPTION OF THE PREFERRED EMBODIMENT

The present invention will be described hereinunder in detail with reference to the accompanying drawing.

The FIGURE is a block diagram of one example of the photographic emulsion manufacturing process for carrying out the present invention.

In the Figure, the reference numeral 1 denotes an arithmetic control unit which receives a plurality of patterned manipulated variables $_M(k)$, a plurality of control target values $_M(k)$ and a plurality of state quantity signals $(k)$, subjects them to various calculations and generates manipulated variables $(k)$ which enable the system to be run in an optimal operative state. Each of $_M$ and $_M$ is a set of pattern data which are taken out from a data base incorporated in a computer and are most suitable for use in the photographic emulsion manufacturing process. As the arithmetic control unit 1, for example, a computer may be employed.

The numeral 2 denotes a real plant which receives the output (k) of the control unit 1 and grows crystals of silver halide. The manipulated variables (k) obtained as the result of the arithmetic operation carried out by the control unit 1 are applied to the real plant 2 and act in such a manner as to maintain controlled variables (e.g., the silver concentration or potential in the solution and the pH value thereof) in the plant 2 at constant levels.

Process variates (k) (e.g., the silver potential and the pH value) obtained as the results of the control are obtained from the plant 2. A plant model 3 receives the output (k) of the plant 2 and the output (k) of the arithmetic control unit 1. This plant model 3 consists of a set of a plurality of arithmetic formulae. The plant model 3 generates a plurality of state quantity signals (k) which are applied to the arithmetic control circuit 1. A feedback element 4 receives difference $y$ between reference patterns $R$ (k) and the plant outputs (k) and generates a controlled value feedback matrix $b$. The present invention will now be described in detail by employing the thus arranged process.

The set (k) of a plurality of process inputs, such as the flow rate of silver nitrate, is expressed by the following formula:

$$(k) = [U_1(k), \ldots, U_n(k)]^T \quad (1)$$
$$= [\ _M^T(k), \ c^T(k)]^T \quad (2)$$

where T is a signal which represents a transposed matrix.

The matrix elements $U_1(k), \ldots, U_n(k)$ expressed in the formula (1) respectively represent inclusive input elements and may be expressed by a column vector which consists of n rows and one column. The matrices $_M^T(k)$ and $c^T(k)$ expressed in the formula (2) represent practical inputs. The matrix $_M^T(k)$ is a set of pattern data which are taken out from a data base incorporated in the computer and are most suitable for use in the photographic emulsion manufacturing process, as described above. This set of pattern data is input to the arithmetic control unit 1 as patterned manipulated variables. The matrix $c^T(k)$ is a set of manipulated variables which minimize the evaluation function $J(k)$ which will be described later. This set of manipulated variables is applied to the plant 2. As these manipulated variables, for example, KBr and HAc are employed.

$_M^T(k)$ and $c^T(k)$ are respectively expressed by the following formulae:

$$_M(k) = [U_{M,1}(k), \ldots, U_{M,n-s}(k)]^T \quad (3)$$

$$c(k) = [U_{C,1}(k), \ldots, U_{C,s}(k)]^T \quad (4)$$

In the above formulae, the set $c(k)$ of manipulated variables is a column vector which consists of s rows and one column and is represented by s elements. The set $_M(k)$ of manipulated variables is a column vector which consists of $(n-s)$ rows and one column and is represented by $(n-s)$ elements, where n is the total number of input elements expressed in the formula (1), and s is the number of manipulated variables $U_C(k)$.

The output (k) of the plant 2 is expressed by the following formula:

$$(k) = [Y_1(k), \ldots, Y_s(k)]^T \quad (5)$$

In the above formula, Y (k) is a column vector which consists of s rows and one column in a manner similar to that of $c(k)$.

The set (k) of a plurality of states, such as the silver halide concentration, is expressed by the following formula:

$$(k) = [X_1(k), \ldots, X_m(k)]^T \quad (6)$$

In the above formula, the set (k) of state quantities is a column vector which consists of m rows and one column and is expressed by m elements. The variables (k) are obtained from the plant model 3 as described above.

The set $_M(k)$ of a plurality of target values (values which the process should follow), such as the silver potential, is expressed by the following formula:

$$_M(k) = [Y_{M,1}(k), \ldots, Y_{M,s}(k)]^T \quad (7)$$

The set $_M(k)$ of target values is a column vector which consists of s rows and one column and which is represented by s elements. These elements are previously extracted from the data base as optimum patterns, as described above. The set $_M(k)$ of target values is applied to the arithmetic control unit 1.

Then, the system is approximated by a non-linear equation of state which is expressed by the following formula:

$$(k) = (k, \ ', (k), \ '(k)) \quad (8)$$

In the formula (8), represents that (k) is a nonlinear function of $'(k)$ and $'(k)$.

$'(k)$ is a set of outputs (k) including changes with time and is given by the following formula:

$$'(k) = [\ (k), \ (k-1), \ldots, \ (k-ly)] \quad (9)$$

$'(k)$ is a set of inputs (k) including changes with time and is given by the following formula:

$$'(k) = [\ (k), \ (k-1), \ldots, \ (k-lu)] \quad (10)$$

In the above formula, ly and lu respectively represent dead times.

An evaluation function J (k) such as that given by the following formula will now be considered.

$$J(k) = \ _Y^T(k) \cdot \ (k) \cdot \ _Y(k) + \Delta \ _C^T(k) \cdot (k) \cdot \Delta \ _C(k) \quad (11)$$

In the above formula, the matrix $_Y(k)$ represents the difference between the output matrix (k) and the reference pattern matrix $_R(k)$ and is expressed by the following formula:

$$_Y(k) = (k) - \ _R(k) \quad (12)$$

$\Delta U_C(k)$ represents the difference between the manipulated variable $_C(k)$ and the manipulated variable matrix $_C(k-1)$ at the time $(k-1)$ and is given by the following formula:

$$\Delta \ _C(k) = [\ _C(k) - \alpha \cdot \ _C(k-1)] \quad (13)$$

in the formula (13) is a function for correcting the input limitation of the plant and expressed by $$= \frac{\Delta\ (k) \cdot \Delta t}{A}$$

where $\Delta\ (k) = c(k) - \alpha \cdot c(k-1)$;

A is a value determined by the controlled variables and the process variables and, for example, 1 or 2; and $\Delta t$ is a unit time.

In the above formulae, $\Delta\ (k)$ may be expressed merely by $$\Delta c(k) = c(k) - c(k-1);$$

$\alpha$ is a matrix indicating the weight ranking with respect to the change of the process variables of the plant; and 2 may be expressed merely by $$2(k) = (k) - (k-1).$$

In the formula, (k) and R (k) are matrices of weights, (k) being an output error weight matrix, and (k) being a manipulation change weight matrix. These matrices are respectively defined as follows:

$$(k) = \text{diag}\ [Q_1(k), \ldots, Q_s(k)] \quad (14)$$

$$(k) = \text{diag}\ [R_1(k), \ldots, R_n(k)] \quad (15)$$

The symbol "diag" in the formulae (14) and (15) represents a diagonal matrix. The first term on the right-hand side of the formula (11) is an evaluation portion with respect to the error matrix $\gamma$, while the second term works in such a manner that, when changes in the process variates are expressed by the formula (13), the second term minimizes the changes in the process variates or causes the flow rate in the process to be minimized.

Thus, the steps in the process shown in the Figure are respectively expressed by the numerical formulae as described above, and feedback matrix $_b(k)$ and a feed-forward control matrix $f(k)$ which minimize the evaluation function J (k) expressed by the formula (11) are obtained by arithmetic operations. Thereafter, manipulated variables $U'_C(k)$ are obtained according to the following formula and are employed as new manipulated variables which are to be applied to the plant 2:

$$'c(k) = c, \ b(k) + c, \ f(k) \quad (16)$$

In the above formula, the first term on its right-hand side, that is, $c, \ b(k)$, represents feedback manipulated variables, and the second term, that is, $c, \ f(k)$, represents feed-forward control manipulated variables, each of these matrices being a column vector which consists of s rows and one column. The matrices $c, \ b(k)$ and $c, \ f(k)$ are expressed as follows.

$$c, \ b(k) = b(k) \cdot (k) + b_M(k) \cdot (k) + b(k) \quad (17)$$

$$c, \ f(k) = f(k) \cdot (k) + f_M(k) \cdot (k) + f(k) \quad (18)$$

In the above formulae, $_b(k)$ is a controlled variable feedback matrix, $b_M(k)$ a pattern feedback matrix, $_b(k)$ a constant feedback matrix, $f(k)$ a controlled variable feed-forward control matrix, $f_M(k)$ a pattern feed-forward control matrix, and $f(k)$ a constant feed-forward control matrix. Each of them is a column vector which consists of s rows and one column. These matrices are respectively expressed by the following formulae:

$$b(k) = [F_{b,1}(k), \ldots, F_{b,s}(k)]^T$$

$$b_M(k) = [F_{bM,1}(k), \ldots, F_{bM,s}(k)]^T$$

$$b(k) = [S_{b,1}(k), \ldots, S_{b,s}(k)]^T$$

$$f(k) = [F_{f,1}(k), \ldots, F_{f,s}(k)]^T$$

$$f_M(k) + [F_{fM,1}(k), \ldots, F_{fM,s}(k)]^T$$

$$f(k) = [S_{f,1}(k), \ldots, S_{f,s}(k)]^T$$

As has been described in detail, it is possible according to the present invention to realize a multivariable control, which cannot be effected by the conventional method, by representing states or phenomena in the process by numerical formulae by means of a non-linear model and effecting arithmetic control on the basis of the formulated plant model. Accordingly, the present invention advantageously enables the silver halide crystal growth process to be controlled in an optimum state at all times.

I claim:

1. A method of controlling the preparation of a photographic emulsion containing silver halide crystals in a system, by measuring process variables in said system and applying a non-linear approximation of said variables to said system in order to control the system by attaining predetermined process variable values by:
    (a) inputting into an arithmetic control unit:
        (1) a set $U_m(k)$ of a plurality of process input variables, comprising a flow rate of silver nitrate,
        (2) a set $Y_m(k)$ of a plurality of target process output values, comprising a silver potential and pH value, and
        (3) a set X(k) of a plurality of state quantity signals, comprising silver halide concentration, from a system model;
    (b) generating from said inputs, a set U(k) of manipulated variables and applying the same to the emulsion preparation in said system to maintain controlled variables of said system, which comprises silver concentration or potential in solution, and pH, at substantially constant levels,
    (c) obtaining output process variables Y(k) from said system, which comprise silver concentration or potential in solution, and pH,
    (d) inputting:
        (1) said output process variables Y(k) from said system, and
        (2) said output variables U(k) from said arithmetic control unit into a system model, which model generates a plurality of state quantity signals X(k) which is then applied to said arithmetic control units;
    (e) generating a controlled value feedback matrix, $F_b$, in a feed-forward matrix from a difference between target values and plant output values which matrix is then used to minimize an evaluation function J(k);
    (f) calculating from said minimized evaluation function, manipulated variables which are then applied to said system, whereby correlations are made to inputs in said system, thereby effecting multivariable control of said emulsion preparation, and the growth of said silver halide crystals therein.

2. The method according to claim 1, wherein set $U_m(k)$ comprises matrix $U_m^T(k)$ which is a set of pattern data obtained from a data base, and matrix $U_c^T(k)$ which is a set of manipulated variables which minimize said evaluation function J(k).

* * * * *